(12) United States Patent
Kodama

(10) Patent No.: US 6,690,329 B2
(45) Date of Patent: Feb. 10, 2004

(54) VEHICLE SURROUNDINGS MONITORING DEVICE

(75) Inventor: Katsuhisa Kodama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/000,216

(22) Filed: Dec. 4, 2001

(65) Prior Publication Data

US 2002/0175867 A1 Nov. 28, 2002

(30) Foreign Application Priority Data

May 25, 2001 (JP) ........................................ 2001-157745

(51) Int. Cl.[7] .................................................. H01Q 1/32
(52) U.S. Cl. .................... 343/713; 343/711; 343/841
(58) Field of Search ............................... 343/713, 711, 343/712, 841; 340/825, 540; H01Q 1/32

(56) References Cited

U.S. PATENT DOCUMENTS

| | | | | |
|---|---|---|---|---|
| 4,760,394 A | * | 7/1988 | Takeuchi et al. | ............ 340/825 |
| 6,078,294 A | * | 6/2000 | Mitarai | ....................... 343/713 |
| 6,081,237 A | * | 6/2000 | Sato et al. | ................... 343/713 |
| 6,259,412 B1 | * | 7/2001 | Duroux | ....................... 343/713 |
| 6,335,680 B1 | * | 1/2002 | Matsuoka | .................... 340/435 |
| 6,424,892 B1 | * | 7/2002 | Matsuoka | ..................... 701/29 |
| 6,452,533 B1 | * | 9/2002 | Yamabuchi et al. | .......... 342/70 |

OTHER PUBLICATIONS

U.S. Patent Application Ser. No. 09/503,116, Yamabuchi et al., filed Feb. 14, 2000.

* cited by examiner

Primary Examiner—Hoanganh Le
(74) Attorney, Agent, or Firm—Sughrue Mion, PLLC

(57) ABSTRACT

In the vehicle surroundings monitoring device which monitors the surrounding of the vehicle, the device includes a transmitting antenna (2) mounted in the interior of the door mirror of the vehicle and radiates transmitted waves through the mirror surface of the door mirror; and a receiving antenna (3) that receives the reflected waves from an object existing near the vehicle through the mirror surface of the door mirror, a housing (12) of the door mirror and a support portion (15) that supports the surface of the door mirror (7) and has the transmitting antenna (2) and the receiving antenna (3) built therein are made of an electromagnetic shielding material. Instead, an electromagnetic shielding material is arranged on the inner surface of the housing and the inner surface of the door mirror support portion. Instead, an electric wave absorber is arranged on the inner surface of the housing and the inner surface of the door mirror support portion.

6 Claims, 4 Drawing Sheets

VEHICLE SURROUNDINGS MONITORING DEVICE

This application is based on Application No. 2001-157745, filed in Japan on May 25, 2001, the contents of which are hereby incorporated by reference.

BACKGROUND OF THE INVENTION

1. Field of the Invention

The present invention relates to a vehicle surroundings monitoring device that is mounted on a vehicle and monitors the surroundings of the vehicle, and more particularly to a vehicle surroundings monitoring device that calls an alarm to a drive in order to prevent a contact and collision with an obstacle at the time of changing a lane or the like.

2. Description of the Related Art

The inventors of the present invention have already filed an application of a vehicle surroundings monitoring device mounted inside the vehicle door mirror of this kind in Japanese Patent Application No. Hei 11-325688. This vehicle surroundings monitoring device has a transmitting circuit for generating waves to be transmitted, an antenna capable of radiating transmitted waves through a mirror surface of the door mirror, and a receiving circuit for receiving, by the antenna, reflected waves from an object existing near the vehicle, the reflected waves propagating to the antenna through the mirror surface of the door mirror. This vehicle surroundings monitoring device have a reflective film which is formed on the mirror surface of the door mirror by vapor deposition and reflects light of wavelengths in the visible region but allows electric waves of several gigahertz to pass therethrough, and is designed to detect an obstacle behind the vehicle.

Even in the case where a reflective film through which electromagnetic waves can be transmitted are vapor-deposited on a mirror surface of a door mirror as in the above described conventional vehicle surroundings monitoring device, a reflection from a mirror base surface and a reflection due to the reflective film also occur to some extent. For the above reason, electric waves radiated from a transmission antenna are radiated toward not only a back side of a vehicle that travels on a center lane portion but also toward a front side thereof as shown in FIG. 7. For that reason, in the case where electric waves radiated forward of the vehicle are present, since a vehicle running in front of the vehicle is also detected, there arises such a problem in that it is difficult to distinguish between an obstacle in front of the vehicle and an obstacle in the rear thereof.

Also, the reflected waves from the above reflective film are irregularly reflected in the interior of a housing and stray into a receiving antenna. The level of straying of the reflected waves greatly varies according to the relative positions of the mirror base material, the reflective film, the antenna and the housing. In the case where the straying level of the reflected waves has changed significantly, when an obstacle actually exists at a short distance from the vehicle, the obstacle cannot be detected depending on the distance resolution of a radar, or the distance measuring performance is adversely affected by the fluctuation, whereby the possibility of an alarm failure or a false error becomes high.

SUMMARY OF THE INVENTION

The present invention has been made in order to solve the above problem, and therefore an object of the present invention is to provide a vehicle surroundings monitoring device, which is capable of surely detecting an obstacle at the rear of a vehicle without such a detection error that the obstacle in front of the vehicle is detected, by shielding electric waves reflected by a door mirror surface and radiated toward the front of the vehicle.

Also, another object of the present invention is to provide a vehicle surroundings monitoring device, which is capable of supplying accurate alarm information to a driver without deteriorating the distance measuring performance over a short distance by reducing irregular reflection within a housing.

In order to achieve the above objects, according to the present invention, there is provided a vehicle surroundings monitoring device which monitors surroundings of a vehicle, the device comprising: a transmitting antenna which is mounted in the interior of a door mirror of the vehicle and radiates transmitted waves through the surface of the door mirror; and a receiving antenna that receives reflective waves from an object existing near the vehicle through the surface of the door mirror, wherein an electric wave blocking structure which blocks unnecessary electric waves radiating toward the front of the vehicle is provided to a housing of the door mirror and the supporting portion which supports the mirror surface of the door mirror and has the transmitting antenna and the receiving antenna built therein.

In a preferred form of the present invention, the housing and the support portion per se are formed from an electromagnetic shielding material as the electric wave blocking structure.

In another preferred form of the present invention, the electromagnetic shielding material is arranged on an inner surface of the housing and an inner surface of the support portion as the electric wave blocking structure.

In a further preferred form of the present invention, an electric wave absorber is arranged on an inner surface of the housing and an inner surface of the support portion as the electric wave blocking structure.

DESCRIPTION OF THE PREFERRED EMBODIMENTS (Embodiment 1)

Figure 1:
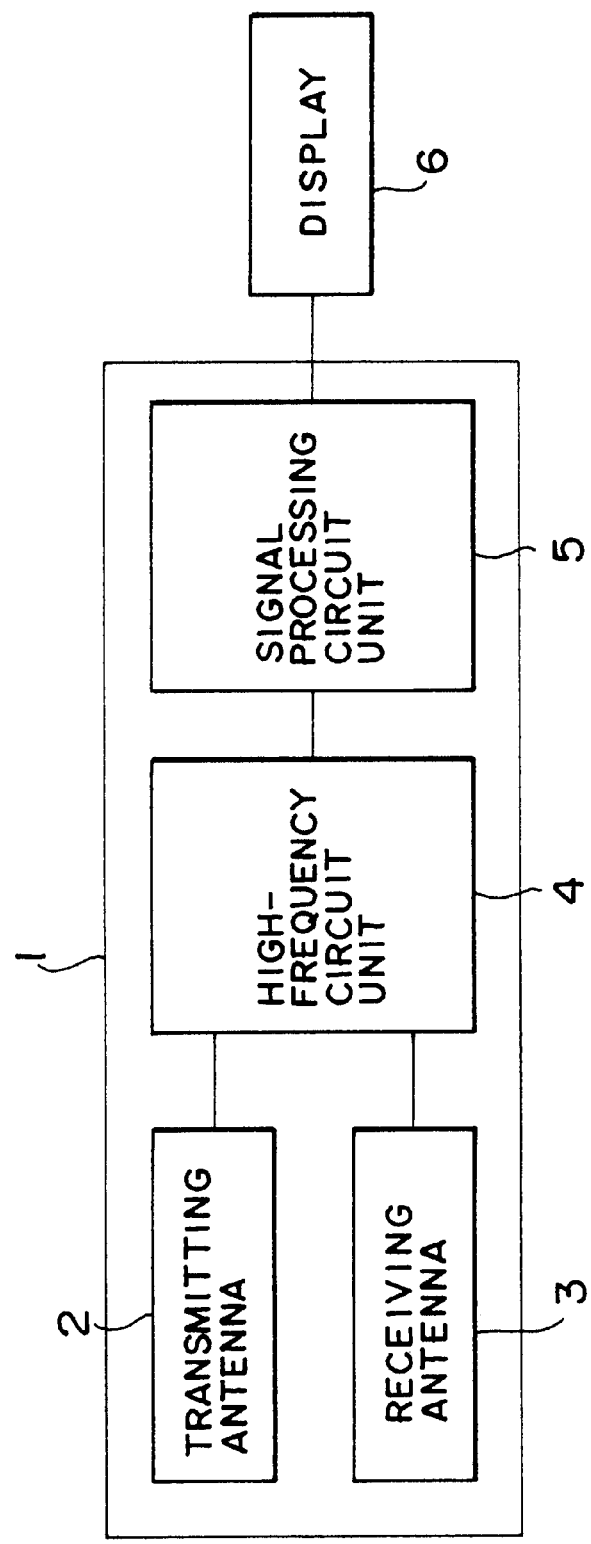
FIG. 1 is a block diagram showing the configuration of a vehicle surroundings monitoring device in accordance with Embodiment 1 of the present invention.

A vehicle surroundings monitoring device which represents Embodiment 1 of the present invention will be described with reference to FIG. 1. Referring to FIG. 1, a vehicle surroundings monitoring device mounted on a vehicle includes a radar 1 and a display 6. The radar 1 has a transmitting antenna 2 for radiating transmitted waves through a door mirror surface described below; a receiving antenna 3 for receiving, through the door mirror surface, reflected waves from an object existing near the vehicle; a high-frequency circuit unit 4 having a transmitting circuit for sending out transmitted waves and a receiving circuit supplied with received waves; and a signal processing circuit unit 5. Results of signal processing in the signal processing circuit 5 are displayed on the display 6 to provide information to a driver.

The radar 1 is mounted in a door mirror assembly of the vehicle, and the display 6 may be placed inside the vehicle or in the vicinity of the door mirror assembly.

Figure 2:
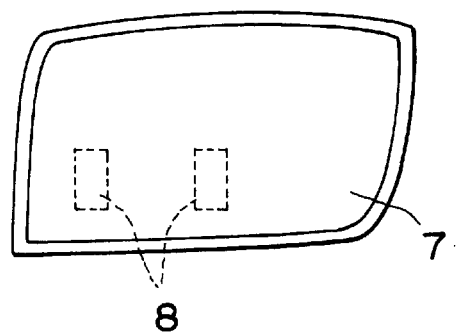
FIG. 2 is a diagram showing a door mirror surface in accordance with Embodiment 1 of the present invention.

Referring to FIG. 2, the structure seen from the door mirror surface side is illustrated. In FIG. 2, the door mirror surface is indicated by a reference numeral 7, opening surfaces for the transmitting antenna 2 and the receiving antenna 3 are indicated by a reference numeral 8. The transmitting antenna 2 and the receiving antenna 3 are placed on the back of the door mirror surface 7.

The operation of this embodiment will now be described.

Electric waves generated by the high-frequency circuit 4 are radiated out of the vehicle from the transmitting antenna 2 through the door mirror surface 7 and are reflected by an obstacle such as another vehicle existing near the vehicle having the monitoring device. The reflected waves enter the door mirror through the door mirror surface 7 to be received by the receiving antenna 3 and input to the high-frequency circuit unit 4. The received waves input to the high-frequency circuit unit 4 are down-converted into a low-frequency signal. This signal is input to the signal processing circuit 5, in which the distance to the obstacle, etc., are computed. If a risk of collision against the obstacle is thereby recognized, the driver is alerted to the risk by the display 6.

Figure 3:
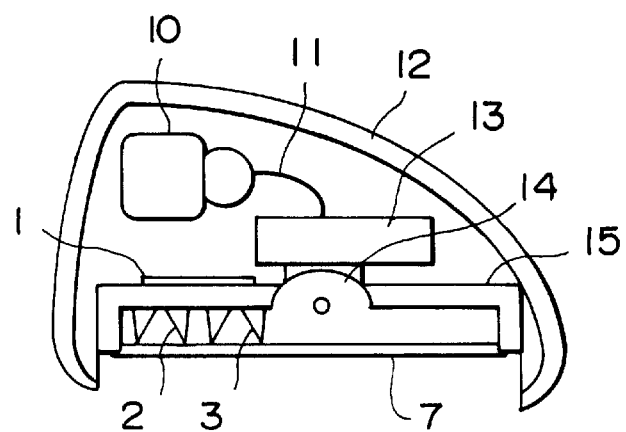
FIG. 3 is a diagram showing the internal structure of a door mirror assembly and an electromagnetic shield structure in accordance with Embodiment 1 of the present invention.

FIG. 3 is a diagram showing the internal structure of a door mirror assembly.

In FIG. 3, reference numerals respectively indicate a motor 10, a motor harness 11, a housing member 12, an actuator unit 13 as a drive unit for moving a door mirror, a connecting portion 14, and a support portion 15. A radar 1 is fixed in the support portion 15.

The housing 12 of the door mirror and the mirror support portion 15 that supports the mirror surface 7 of the door mirror and has the transmitting antenna 2 and the receiving antenna 3 built therein are themselves made of metal or electrically conductive material to provide an electromagnetic shield function.

For that reason, in the vehicle surroundings monitoring device having the mirror surface 7 corresponding to the transmitting antenna 7 and the receiving antenna 3, the housing 12 and the mirror support portion 15 are formed with an electromagnetic shield structure, whereby an electric wave blocking structure is provided in which unnecessary electric wave, that is a part of transmitted waves from the transmitting antenna 2, which are reflected by the door mirror surface 7; pass through the housing 12 and the mirror support portion 15; and are then radiated toward the front of the vehicle, are blocked. As a result, the obstacle at the rear of the vehicle can be surely detected without such a detection error that the obstacle in front of the vehicle is detected.

(Embodiment 2)

A block diagram showing the structure of Embodiment 2 is identical with that of the first embodiment. Only differences from the first embodiment will be described below.

Figure 4:
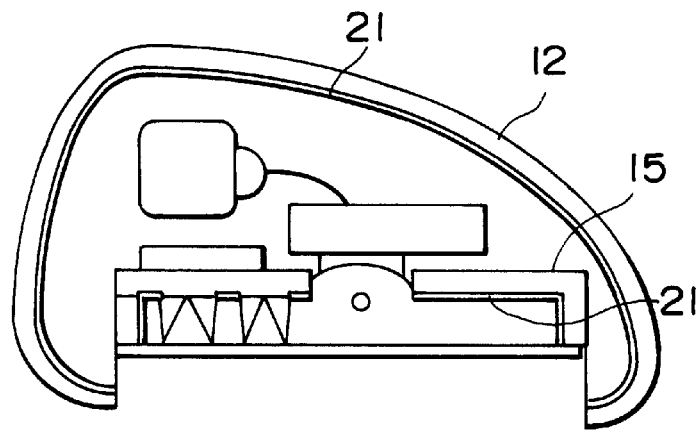
FIG. 4 is a diagram showing the electromagnetic shielding material in the inner surface of the housing in accordance with Embodiment 2 of the present invention.

FIG. 4 shows the formation of an electromagnetic shield structure by arranging a metal plate and an electrically conductive plate 21 in the inner surface of the housing 12 and the inner surface of the mirror support portion 15. Alternatively, the electromagnetic shield structure may be formed by plating or coating a metal or an electrically conductive material on the inner surface of the housing 12 and the inner surface of the mirror support portion 15.

(Embodiment 3)

A block diagram showing the structure of Embodiment 3 is identical with that of Embodiments 1 and 2. Only differences from Embodiments 1 and 2 will be described below.

Figure 5:
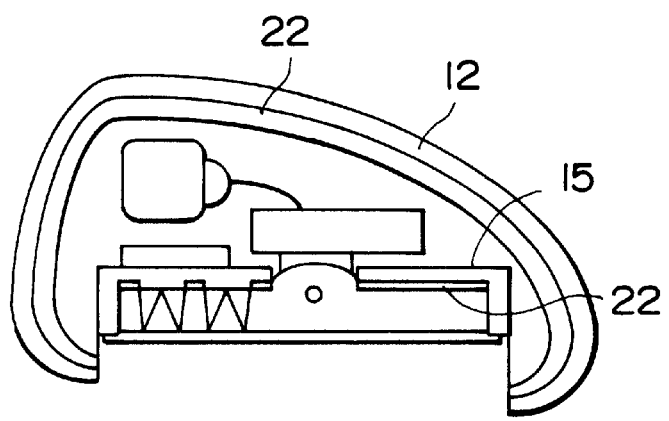
FIG. 5 is a diagram showing the electric wave absorber in the inner surface of the housing in accordance with Embodiment 3 of the present invention.

FIG. 5 shows a structure in which an electromagnetic wave energy entered into the housing 12 and the mirror support portion 15 is absorbed in the interior of an electric wave absorber 22 by arranging the electric wave absorber 22 on the inner surfaces of the housing 12 and the mirror support portion 15.

In the electric wave shielding structure using a metal and an electrically conductive material according to the above-described Embodiments 1 and 2, there is formed the electromagnetic shield structure that blocks electric waves that are transmitted toward the front of the vehicle by reflecting the electromagnetic waves entered into the housing 12 and the mirror support portion 15 by the inner surfaces thereof. On the other hand, in the electric wave blocking structure according to Embodiment 3, there is formed an electric wave absorbing structure in which the electric wave absorber 22 is arranged on the inner surfaces of the housing 12 and the mirror support portion 15, and the electric wave absorber 22 reduces the electric waves which are reflected toward the front thereof and the electric waves which are transmitted to the rear thereof by absorbing most of the incident electric waves by the interior thereof. The electric wave absorber 22 is made of a resistant absorbing material, a dielectric absorbing material, a magnetic absorbing material or the like, and such electric wave absorbing material is formed into a single-layer or a multi-layer sheet to thereby form the electric wave absorber.

In the vehicle surroundings monitoring device having the mirror surface 7 corresponding to the transmitting antenna 2 and the receiving antenna 3, the electric wave absorber 22 is disposed on the inner surfaces of the housing 12 and the mirror support portion 15 as described above, to block the electric waves reflected by the door mirror surface and radiated toward the front of the vehicle. Therefore, it is possible to prevent such a detection error that the obstacle in front of the vehicle is detected, thereby being capable of surely detecting the obstacle at the rear of the vehicle. In addition, the irregular reflection in the interior of the housing is reduced, thereby being capable of supplying accurate alarm information to a driver without deteriorating the distance measuring performance over the short distance.

Figure 6:
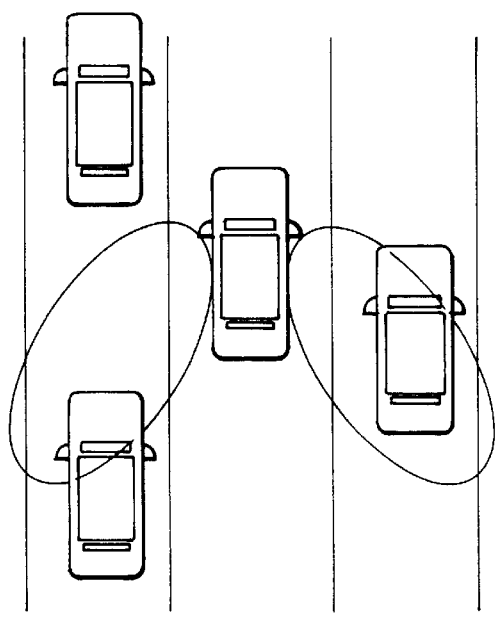
FIG. 6 is a diagram showing the radar radiating state of the vehicle surroundings monitoring device in accordance with Embodiments 1 to 3 of the present invention.
Figure 7:
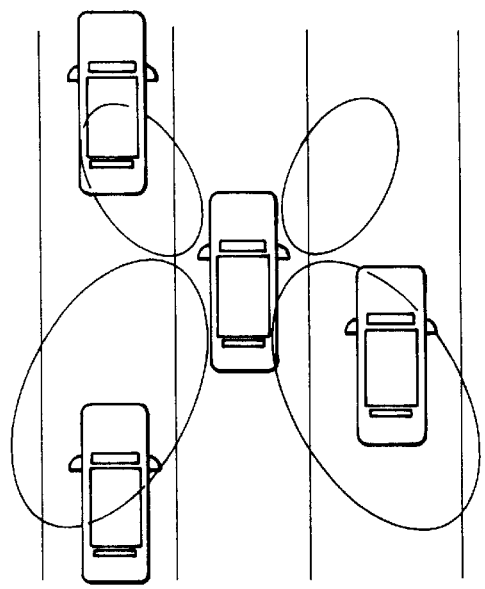
FIG. 7 is a diagram showing the radar radiating state of the vehicle surroundings monitoring device in the conventional example.

As described above, according to Embodiments 1 to 3, because the electric waves reflected by the door mirror surface and radiated toward the front of the vehicle can be blocked, as shown in FIG. 6, the electric waves radiated from the transmitting antenna are radiated to only the rear side of the vehicle that travels the center lane portion without being radiated toward the front of the vehicle, thereby being capable of surely detecting the obstacle at the rear of the vehicle.

As described above, according to the present invention, in the vehicle surroundings monitoring device, which monitors the surrounding of the vehicle, the device includes the transmitting antenna mounted in the interior of the door mirror of the vehicle and radiates the transmitted waves through the surface of the door mirror, and the receiving antenna that receives the reflected waves from an object existing near the vehicle through the surface of the door mirror, the housing of the door mirror and the support portion that supports the mirror surface of the door mirror and has the transmitting antenna and the receiving antenna built therein have the electric wave blocking structure that blocks the unnecessary electric waves which are radiated toward the front side of the vehicle, thereby the electric waves reflected by the door mirror surface and radiated toward the front of the vehicle are blocked, whereby being capable of surely detecting the obstacle at the rear of the vehicle without any detection error such that the obstacle in front of the vehicle is detected.

Also, since the housing and the door mirror support portion per se are made of the electromagnetic shielding material as the above electric wave blocking structure to block the electric waves reflected by the door mirror surface and radiated toward the front of the vehicle, thereby being capable of surely detecting the obstacle at the rear of the vehicle without any detection error such that the obstacle in front of the vehicle is detected.

Further, since the electromagnetic shielding material is disposed on the inner surfaces of the housing and the door mirror support portion as the above electric wave blocking structure to block the electric waves reflected by the door mirror surface and radiated toward the front of the vehicle, thereby being capable of surely detecting the obstacle at the rear of the vehicle without any detection error such that the obstacle in front of the vehicle is detected.

In addition, since the electric wave absorber is disposed on the inner surfaces of the housing and the door mirror support portion as the above electric wave blocking structure to block the electric waves reflected by the door mirror surface and radiated toward the front of the vehicle, thereby being capable of surely detecting the obstacle at the rear of the vehicle without any detection error such that the obstacle in front of the vehicle is detected. Also, the irregular reflection in the interior of the housing is reduced, thereby being capable of supplying accurate alarm information to a driver without deteriorating the distance measuring performance over a short distance.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle surroundings monitoring device which monitors a peripheral area surrounding a vehicle, said device comprising: a transmitting antenna which is mounted in the interior of a door mirror of the vehicle, and which radiates transmitted waves through the surface of the door mirror; and a receiving antenna that receives waves reflected from an object existing near the vehicle through the surface of the door mirror, wherein a frontward wave blocking structure which blocks unnecessary waves radiating toward the front of the vehicle is provided in a housing of the door mirror and at a supporting portion which supports the mirror surface of the door mirror and has the transmitting antenna and the receiving antenna built therein.

2. The vehicle surroundings monitoring device as claimed in claim 1, wherein said housing and said support portion are formed from an electromagnetic shielding material as said frontward wave blocking structure.

3. The vehicle surroundings monitoring device as claimed in claim 1, wherein electromagnetic shielding material is arranged on an inner surface of said housing and an inner surface of said support portion as said frontward wave blocking structure.

4. The vehicle surroundings monitoring device as claimed in claim 1, wherein an electromagnetic wave absorber is arranged on an inner surface of said housing and an inner surface of said support portion as said frontward wave blocking structure.

5. The device according to claim 1, wherein the frontward wave blocking structure blocks electromagnetic waves.

6. A surroundings monitoring device which monitors a peripheral area, said device comprising: a transmitting antenna which is mounted in the interior of a door mirror of the vehicle, and which radiates transmitted waves through the surface of the door mirror; and a receiving antenna that receives waves reflected from an object, wherein a frontward wave blocking structure which blocks waves radiating toward the front of the vehicle is provided in a housing of the door mirror and at a supporting portion which supports the mirror surface of the door mirror and has the transmitting antenna and the receiving antenna built therein.

* * * * *